(12) United States Patent
Wcislo et al.

(10) Patent No.: US 7,686,617 B2
(45) Date of Patent: Mar. 30, 2010

(54) MANUFACTURING OF THREE-DIMENSIONAL TOPOGRAPHICAL SCALE MODELS FOR THE PURPOSE OF SCIENCE

(76) Inventors: Adam Wcislo, 499 A Kingscourt Drive, Waterloo, Ontario (CA) N2K 2X9; Zofia Anna Sawkiewicz, 499A Kingscourt Drive, Waterloo, Ontario (CA) N2K 2X9

( * ) Notice: Subject to any disclaimer, the term of this patent is extended or adjusted under 35 U.S.C. 154(b) by 436 days.

(21) Appl. No.: 10/839,238

(22) Filed: May 6, 2004

(65) Prior Publication Data

US 2005/0115657 A1    Jun. 2, 2005

(51) Int. Cl.
B32B 37/00    (2006.01)
(52) U.S. Cl. .................. 434/150; 156/250; 156/267; 434/152
(58) Field of Classification Search ............ 156/59, 156/250, 267, 60, 200, 196, 463; 434/150, 434/152
See application file for complete search history.

(56) References Cited

U.S. PATENT DOCUMENTS

| 1,443,624 | A | * | 1/1923 | Heise | 409/84 |
| 2,189,592 | A | * | 2/1940 | Perera | 434/152 |
| 2,412,534 | A | * | 12/1946 | Randall | 156/281 |
| 5,537,161 | A | * | 7/1996 | Monroe | 351/51 |
| 5,686,154 | A | * | 11/1997 | Brown, Jr. | 428/15 |
| 5,703,782 | A | * | 12/1997 | Dundorf | 700/182 |

FOREIGN PATENT DOCUMENTS

WO    WO-01/77987 A1 * 10/2001

OTHER PUBLICATIONS

Clark, et al, "Visualization of Height Field Data with Physical Models and Texture Photomapping", technical paper, IEEE Annual Conference, Oct. 19-24, 1997, Conference Proceedings, pp. 89-94.*

"Topographic Map Interpretation", internet pages from the website http://www.homepage.montana.edu/-usewl/topotechs/map_profiles.htm, dated Oct. 5, 1999 (2 pages provided, excluding dated waybackmachine page from archive.org).*

"Introduction to Topographic Maps", Vertical Exaggeration, internet pages from the website http://geology.isu.edu/geostac/Field_Excercise/topomaps/vert_ex.htm, dated Nov. 27, 2003 (3 pages provided excluding dated waybackmachine page from archive.org).*

Metzger, Ellen P., "Building a Topographic Model", internet pages from the website http://www.ucmp.berkley.edu/fosrec/Metzger1.html, dated Jun. 6, 1997 (6 pages provided, excluding dated waybackmachine page from archive.org).*

"Carved Wooden Maps" from the internet site http://www.peasley.com/topt_carvings.htm, dated Feb. 8, 2002 (5 pages provided excluding dated waybackmachine page from archive.org).*

* cited by examiner

*Primary Examiner*—Jeff H Aftergut

(57) ABSTRACT

The invention shows the method to create a high accuracy topographical scale model for the purpose of science by using multi layered/laminated materials. The invention is based on and involves the following steps:

The geometry and the data of terrain are measured, collected, and recorded;

The data is entered into a computer and design components are added, if needed;

Based on these data a three-dimensional surface is created;

A block of multi-layered/laminated materials made of a combination of veneers, or machinable dividers/layers, laminated one on the top of another, is constructed.

Based on the three-dimensional surface, a program for a C.N.C machine is generated;

Based on the program, the C.N.C. machine cuts/removes the excess material from the block of multi-layered materials. The three-dimensional surface, contour lines, elevations, outlines, and edges are then exposed automatically and are easy visually measurable.

8 Claims, 5 Drawing Sheets

MANUFACTURING OF THREE-DIMENSIONAL TOPOGRAPHICAL SCALE MODELS FOR THE PURPOSE OF SCIENCE

FIELD OF THE INVENTION

The present invention relates to the method of creating topographical models. More particularly, the present invention relates to an improved three-dimensional topographical model made of dense materials which allow a person to touch and to feel the surface he/she is investigating with their own hands. Still more particularly, the present invention relates to a topographical model of accuracy comparable to the accuracy of the three-dimensional computer-generated drawing, for the purpose of physical and visual measuring and easy understanding of the landform in any point of the model by technical and non-technical personnel.

BACKGROUND OF THE INVENTION

Topographical, three-dimensional models provide a physical representation of the landform.

The models can be created using a copy of the drawings of the terrain as a reference during model construction or by using a three-dimensional modeling program on a computer to generate a model data.

Traditionally, topographical models are made from a high-density foam, plastic foam, acetate, etc. The models must be enclosed to prevent people from touching. The purpose of these models is to see the features of terrain but not to touch them.

The most important disadvantages of the physical models are the inability to measure the elevational differences of the terrain in any point of the model and the lack of accuracy.

To show the elevational differences of the terrain, some of the models are created in stair-stepping style. Other models, are created by printing detailed photo-realistic images on the models carved from a high-density foam. These models can provide a physical representation of the terrain, but they are not made for easy Visual measuring because of the lack of an elevation reference, and they are not comparable to the accuracy of the three-dimensional computer-generated drawing.

SUMMARY OF THE PRESENT INVENTION

It is the object of the present invention to provide a three-dimensional topographical scale model of accuracy comparable to the accuracy of computer-generated three-dimensional drawing, which can be used for scientific purposes.

It is another object of the present invention to provide a three-dimensional topographical scale model which has a smooth surface and, without being fully covered with paint or any other texture, can be easy visually understood and measured.

It is still another object of the present invention to provide a three-dimensional topographical model made of dense materials allowing a person to touch and to feel the surface he/she is investigating with their own hands. These models can also be used as a visualization tool for blind and visually impaired persons.

These and other objects, features, and advantages of the present invention are accomplished through the use of an improved three-dimensional topographical scale model. The model is comprised of a plurality of layers made of a combination of veneers of various colors, or a combination of plywood and veneers or machinable dividers/layers, as required for a designated scale model. Based on the data entered or designed in a computer a three-dimensional surface is created. Based on the three-dimensional surface, a program for a C.N.C machine is generated. Based on this program, the C.N.C. machine cuts/removes the excess material from the block of multi-layered materials. The three-dimensional surface, contour lines, elevations, cross-sections, outlines, and edges are then exposed automatically and are easy to understand and visually measured.

Objects, features, and advantages of the present invention will become more apparent in the following written description.

BRIEF DESCRIPTION OF THE DRAWINGS

A three-dimensional topographical model embodying features of my invention is described in the accompanying drawings which form a portion of this disclosure and wherein:

FIG. 4 is a picture to show and aid in understanding the concept of my invention.

FIG. 1 shows two-dimensional levels of elevation spread vertically, according to the actual measurement of the elevation, which means that the whole computer drawing is in three dimensions.

FIG. 2 shows the same levels of elevation as shown on FIG. 1 and the surface created in the computer based on data from FIG. 1.

FIG. 3 shows the same surface as shown on FIG. 2 but without levels of elevation.

FIG. 4 is a picture of a part of the topographical scale model created based on FIG. 3. The picture shows a combination of patterns made of 3-ply plywood and veneers and shows some of the other man-made properties of the project.

DETAILED DESCRIPTION OF THE INVENTION

The invention shows the method to create a high accuracy topographical scale model for the purpose of science/land development.

Figure 1:
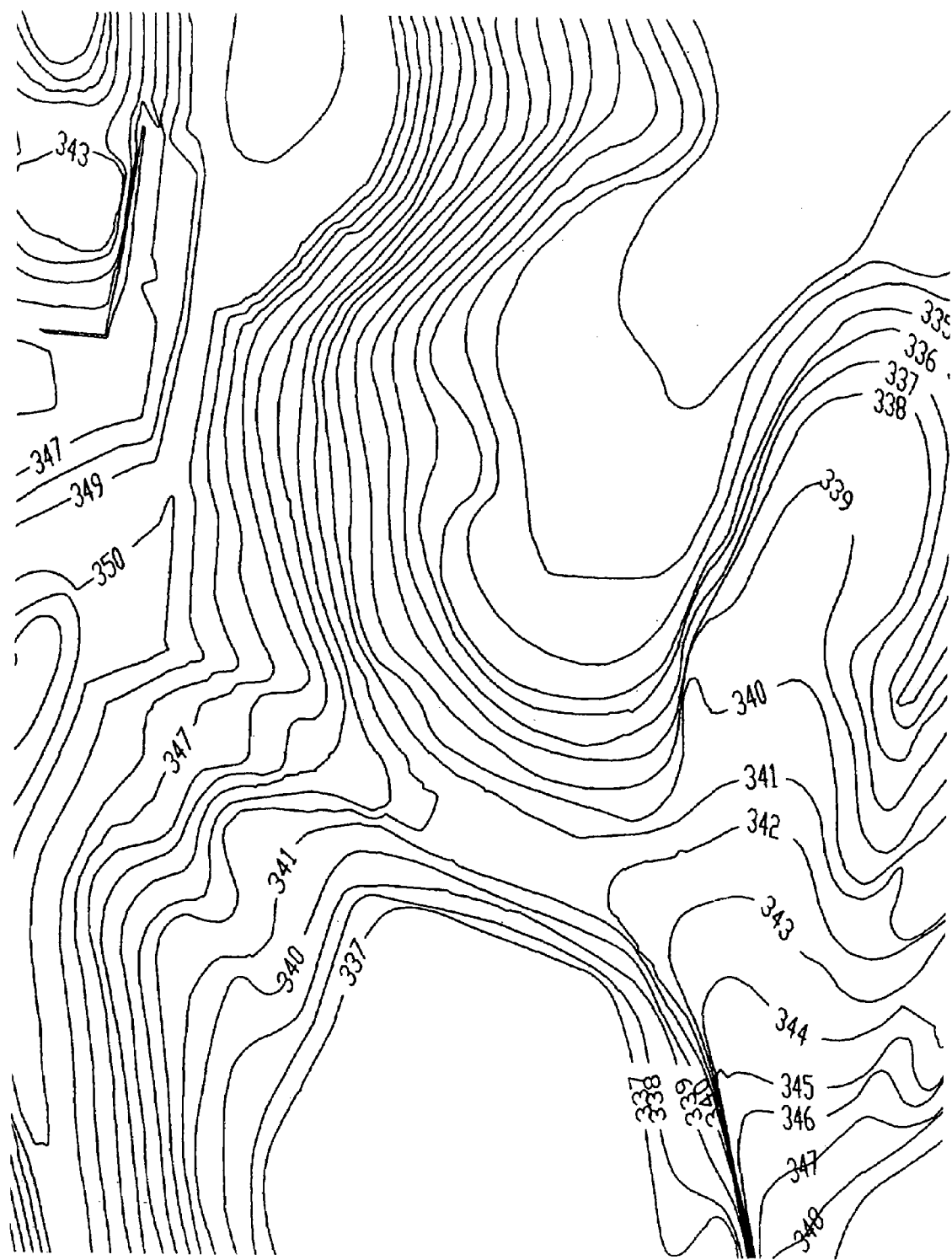
FIG. 1, FIG. 2, FIG. 3, and FIG. 4 are shown in isometric view.

A more complete understanding of the invention may be obtained by reference to the accompanying drawings. The invention is based on and involves the following steps:

The geometry data of terrain is entered into a computer to prepare a contour plan as a hi-accuracy representation of terrain, shown as a series of curved lines where each line has a measured and recorded elevation, set at a fixed vertical contour interval apart, representing lines of equal elevation (FIG. 1). At this stage of the project, the design features of the terrain may be added, as required.

Figure 2:
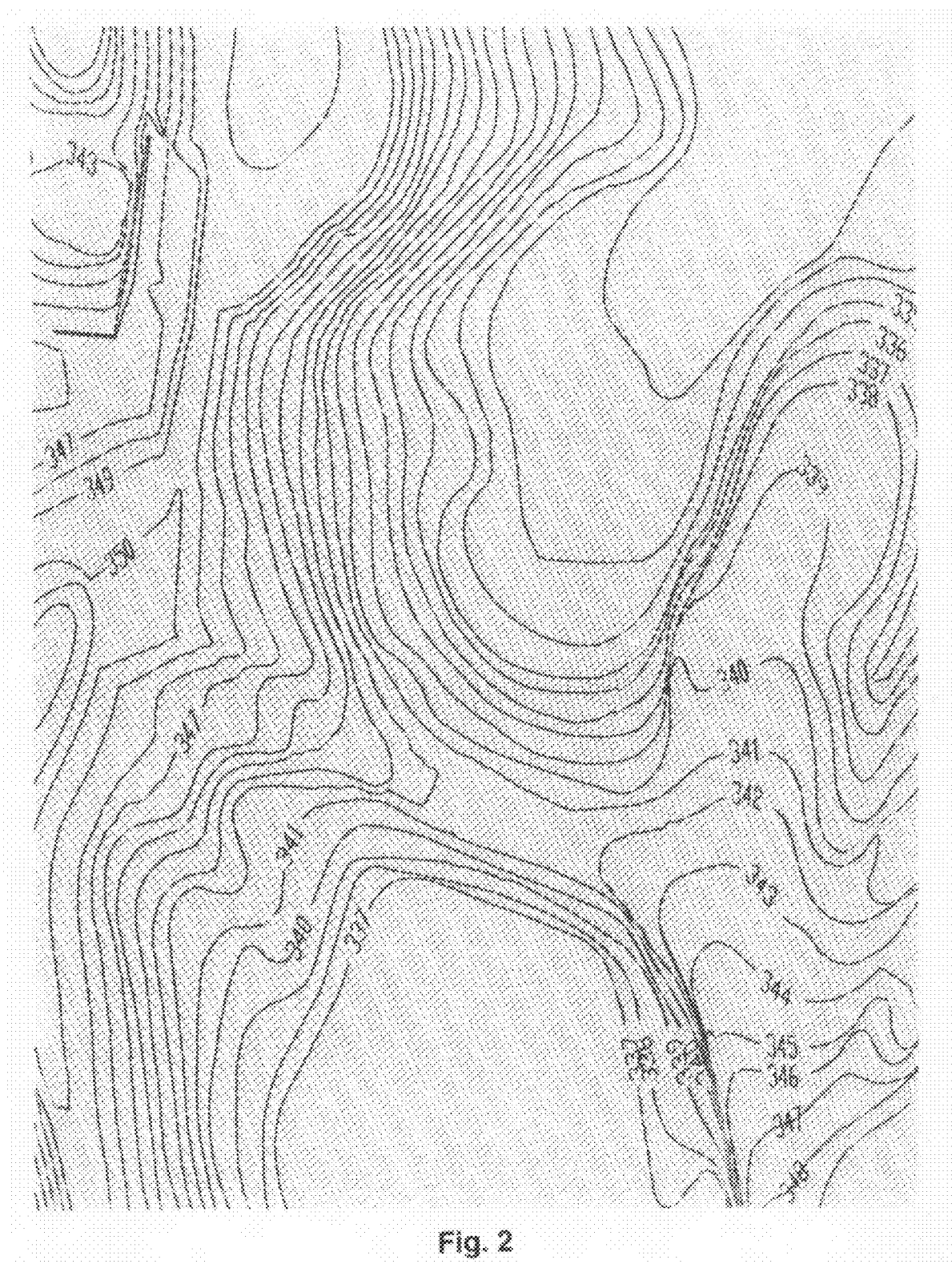
Figure 3:

Based on this data, a three-dimensional surface is created (FIG. 2 and FIG. 3). Further in this stage is decided the scale for the model and if a vertical exaggeration is needed. The three-dimensional surface is scaled to the designated scale for the model.

The model will be constructed from dense materials to allow a person to understand the model by touching. The visual recognition of the levels on the model for the purpose of easy visual measuring the height of terrain will be achieved by selecting veneers, and/or machinable dividers, and/or plywood, and adhesive, different or the same kind, different or the same colour, or a special appearance to be used in the sets and in the block. The selected veneers or machinable dividers are composed in a pattern to mark a height/elevation for a visual reference of a level/elevation, where one veneer or machinable divider will represent one level of the specific height/elevation in the geometry of terrain. When plywood is a part of composition, than one ply of plywood will represent one level of the specific height/elevation in the geometry of terrain. The composition of selected materials is permanently laminated one on the top of another to form the levels in a set and the sets are permanently laminated one on top of another to form a block. If required for easy visual separation of the levels in the set and in the block, the colour adhesive will be used for laminating the levels to form the set, and for easy visual separation of the sets in the block, the colour adhesive will be used for laminating the sets to form the block. The colour adhesive needs to be used when levels in the set are similar or have the same colour. Assign to each level a level number and a specific value.

Figure 5:
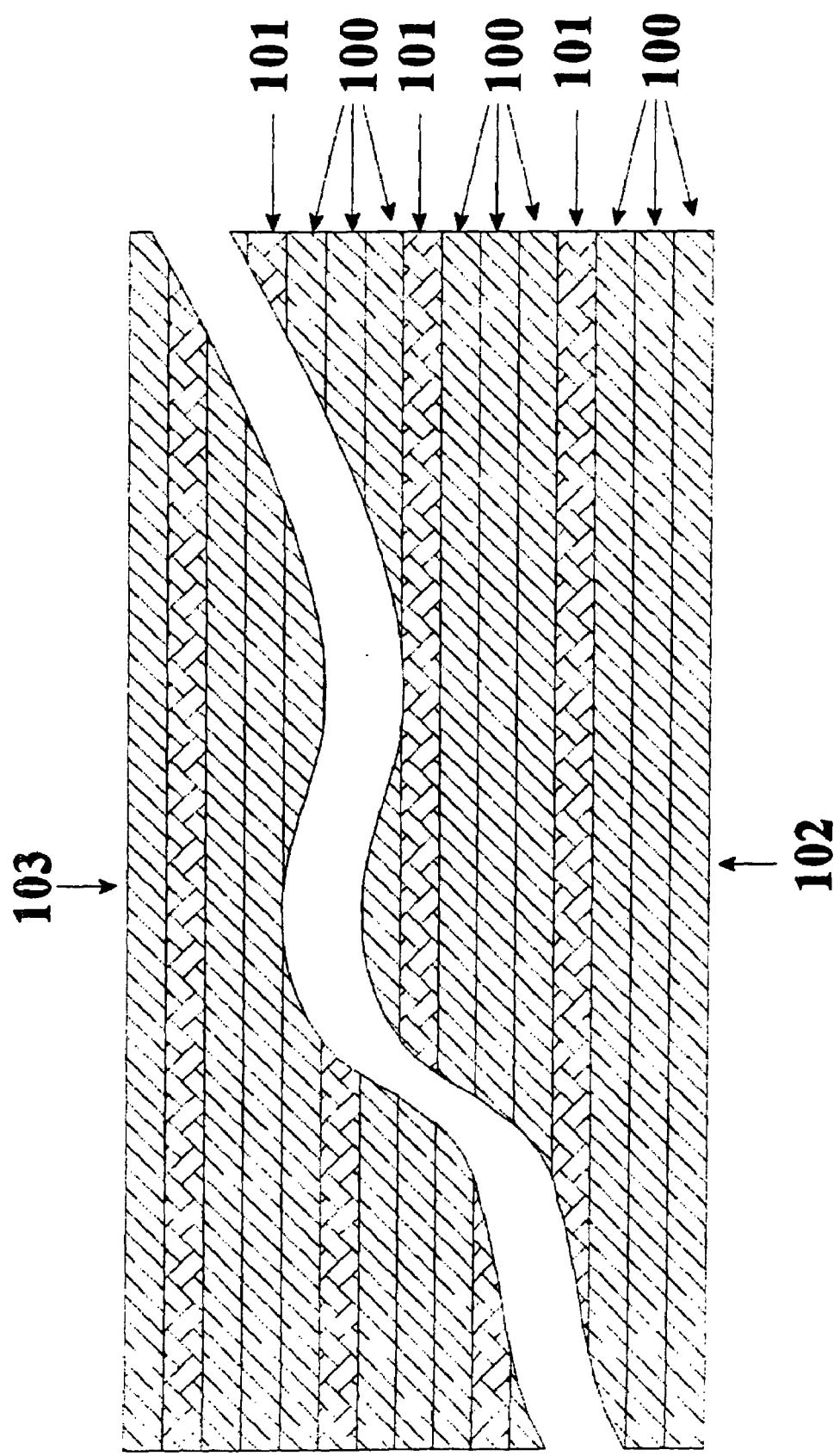
FIG. 5 shows the cross section of a block/model (102), constructed from 3-ply plywood (100) and veneer (101). The picture shows also the excess material to be removed (103).

A block of multi-layered/laminated materials selected from veneers, plywood, machinable dividers/layers, and adhesive, wherein a combination of veneers, or plywood and veneers, or machinable dividers/layers, and adhesive laminated one on top of another, is constructed (FIG. 5). The model is comprised of a plurality of layers made of a combination of veneers of various colors, or a combination of machinable dividers/layers, as required for a designated scale model. The preferred method of representation of landform on the model is by the use of layers of equal thickness.

Based on the three-dimensional surface (FIG. 3), a program for a C.N.C machine is generated to guide the C.N.C. machine in three dimensions to make sure that all excess material from the block of permanently laminated materials is removed.

Figure 4:

Based on the program, by using highly advanced methods for removing of excessive material from the block of multi-layered materials, the C.N.C. machine cuts/removes all excess material (103) from the block of multi-layered materials creating a model (102). The three-dimensional surface, contour lines, elevations, cross-sections, outlines, and edges are then exposed automatically and are easily visually measurable (FIG. 4). Easy visual recognition of levels is achieved by selecting suitable materials, variety of kinds and/or appearance and/or colour, such as veneers, and/or plywood, and/or machinable dividers, and/or adhesive to be the levels.

If required to show a man-made objects on the model (FIG. 4), the C.N.C. machine cuts the surface of the model simultaneously in x, y, and z directions.

Because of the high accuracy data, carefully selected layers kept uniform to each other and color patterns or special dividers to mark the elevation height for a visual reference of the level, by keeping the uniform scale between geometry of terrain and the geometry of topographical scale model, and by using highly advanced methods for removing excessive material, the model becomes highly accurate, comparable to the accuracy of computer-generated three-dimensional drawing, it is easily visually measurable, and from this point it can be used for the purpose of science.

Examples of composition of layers for manufacturing a three-dimensional topographical scale model:

a pattern of one veneer layer on top of one 3-ply plywood layer as one set of four equal layers where one layer represents an elevational increment of a topographical elevation value every 1.25 m or 2.5 m or 5 m;

a pattern of four veneer layers one on the top of another as one set of four equal layers wherein one layer represents an elevational increment of a topographical elevation value every 1.25 m or 2.5 m or 5 m;

a pattern of four layers of machinable dividers one on top of another as one set of four equal layers where one layer represents an elevational increment of a topographical elevation value every 1.25 m or 2.5 m or 5 m;

a pattern of veneer layers of which none of them are the same kind, but if needed, can be divided by every 3 or every 4 or every 5 or every 6 or every 10 or every 12 layers where one of the veneer's represents an elevational increment every specific height of topographical elevation value; and a custom pattern of layers made of machinable dividers as needed, and can be divided by every 3 or every 4 or every 5 or every 6 or every 10or every 12 layers where one of divider's represents an elevational increment every specific height of topographical elevation value.

Example of Manufacturing a Three-dimensional Topographical Scale Model:

Land area: 1000 m by 1000 m; land elevation: 25 m; required scale for model: 1:2000.

Required scale model area: 0.5 m by 0.5 m; scale model height: 0.0125 m. Selected material and pattern for the scale model: plywood 3-ply (100) 0.0015 m thick, wherein one ply of plywood is equal to 0.0005 m and veneer (101) 0.0005 m thick, laminated as veneer on plywood on veneer (FIG. 5) etc. in a block of seven veneers and six 3-ply plywood for the total size of laminated block equal to 0.5 m ×0.5 m and height equal to 0.0125 m. Excess material (103) is removed by the C.N.C. machine and the landform (102) is exposed automatically based on the geometry of the three-dimensional surfaces. The elevation on the model is easy visually recognized on every 0.0005 m layer which is equal to the land elevation of 1.25 m, which means that the elevation on the model is easy visually measurable on every 1.25 m.

The manufacturing of a special area of terrain scaled by a computer to be a model can be cut on blocks with a different pattern, or the blocks can have the same pattern and the area of terrain will change, all in spirit of manufacturing a three-dimensional topographical scale model, where elevation is easily visually measurable.

While various embodiments have been described above, it should be understood that they have been presented by way of example only and not limitation. Thus, the breadth and scope of a preferred embodiment should not be limited by any of the above-described example embodiments, but should be defined only in accordance with the following claims and their equivalents.

The invention claimed is:

1. A method of manufacturing three-dimensional topographical scale models for the purpose of easy visual measuring and easy understanding of the landform on the model comprising:

entering geometry data of terrain into a computer to create a computer-generated three-dimensional contour plan, wherein two dimensional levels are spread vertically, according to an actual measurement, as a high accuracy representation of terrain;

based on said computer-generated three-dimensional contour plan, a three-dimensional surface is generated by the computer, as a high accuracy representation of terrain;

based on required scale of the model, said computer-generated three-dimensional surface is scaled to the required scale of the three-dimensional topographical scale model;

vertical exaggeration is added to said computer-generated three-dimensional surface;

based on said computer-generated three-dimensional surface, a program product for a C.N.C. machine is generated by the computer;

based on dimensions of said three-dimensional topographical scale model laminating a plurality of selected veneers with machinable dividers there between to make a composition of permanently laminated materials as required for a designated scale model; and based on said computer-generated program product for the C.N.C. machine, the C.N.C. machine cuts and removes all excess material from said composition of permanently laminated materials, creating a smooth-finished surface of landform based on the geometry of the computer-generated three-dimensional surface and exposing permanently laminated levels which are easily visually recognized by kind, for the purpose of easy visual measuring a height on every level on the three-dimensional topographical scale model.

2. The method according to claim 1, wherein the high accuracy of the three-dimensional topographical scale model, comparable to the accuracy of computer-generated three-dimensional surface is achieved by generating the program product for the C.N.C. machine based on said computer-generated three-dimensional surface, wherein said program product guides The C.N.C. machine in three dimensions to make sure that all excess material from the composition of permanently laminated materials is removed.

3. A three-dimensional topographical scale model manufactured by the method according to claim 1.

4. A three-dimensional topographical scale model manufactured by the method of claim 1 comprising machinable dividers every 3 levels.

5. A three-dimensional topographical scale model manufactured by the method of claim 1 comprising machinable dividers every 4 levels.

6. A three-dimensional topographical scale model manufactured by the method of claim 1 comprising machinable dividers every 6 levels.

7. A three-dimensional topographical scale model manufactured by the method of claim 1 comprising machinable dividers every 12 levels.

8. A three-dimensional topographical scale model manufactured by the method of claim 1 wherein said composition of permanently laminated materials as levels are composed according to the purpose of science.

* * * * *